A. E. COLE.
BILL AND CORRESPONDENCE SHEET.
APPLICATION FILED MAY 7, 1915.

1,208,293.

Patented Dec. 12, 1916.

UNITED STATES PATENT OFFICE.

ALONZO E. COLE, OF CHICAGO, ILLINOIS, ASSIGNOR TO SEARS, ROEBUCK AND COMPANY, OF CHICAGO, ILLINOIS, A CORPORATION OF NEW YORK.

BILL AND CORRESPONDENCE SHEET.

1,208,293.	Specification of Letters Patent.	Patented Dec. 12, 1916.

Application filed May 7, 1915. Serial No. 26,477.

*To all whom it may concern:*

Be it known that I, ALONZO E. COLE, a citizen of the United States, residing at Chicago, in the county of Cook and State of Illinois, have invented certain new and useful Improvements in Bill and Correspondence Sheets, of which the following is a specification.

In filling mail orders for merchandise, it frequently happens that it is impossible to fill the order exactly as received. Heretofore, when, in filling an order, it has been necessary to vary in some respect from the precise terms of the order, the seller has been obliged to write a letter explaining why the order had not been filed in exact accordance with its terms. The dictation and writing of such letters of explanation, of course, require time and attention, and in the conduct of a large mail order business the writing of such letters imposes upon the business a considerable burden of expense.

The object of this invention, generally stated, is to obviate the necessity of writing a letter of explanation when it is impossible to fill an order exactly as given. This object I attain by the use of a combination bill and correspondence sheet, as will appear more fully hereinafter.

The drawing is a facsimile of a combined bill and correspondence sheet embodying the features of my invention, the sheet being indicated as partially filled out.

In the drawing, 1 indicates a sheet of paper of any suitable size and shape. A portion of this sheet is ruled or otherwise marked so as to constitute a bill, a space A being provided for each item of an order. Associated with each item space are suitable amount spaces in which the price of the item or any other desired information in terms of money may be noted. Herein I have shown spaces B, B¹ and B², but it will be understood that a greater or smaller number may be employed as desired. There may also be associated with each item space A a suitable number of spaces for convenience in making desired records, as, for example, spaces C and C¹. It will, however, be understood that the spaces C and C¹ may be omitted or varied, as required.

Associated with each item space A is a correspondence space D. This space, like the spaces B¹, B², C, C¹, is preferably horizontally alined with the item space. In the correspondence space may be placed any necessary explanation regarding the manner in which the order for the particular item has been filled, or the reason for failing to fill the order for such item.

Below the spaces hereinbefore described, there may be a group of spaces for records and summaries of a general nature, as, for example, the group of spaces E. It will be seen that the spaces above the division line F are all related to specific items, while the spaces below said line are general to the entire order.

In practice, when an order is filled, each item shipped is noted upon the combined bill and correspondence sheet, each item being given a separate space A. In addition, any item ordered but not sent is also noted in a space A upon the sheet. If in filling the order any variation has been made from the terms of the order, an appropriate explanation is placed in the correspondence space D opposite the item in question. Thus if an item ordered is not in stock, and something slightly different has been shipped in its place, a statement to that effect is placed in the correspondence space D opposite the item. While any suitable means may be employed in placing the necessary explanations in the spaces D, the preferred method is to employ rubber stamps, a rubber stamp for each of the explanations usually called for being provided for the use of the clerk.

It will be noted that the rubber stamp imprints illustrated in the drawing do not specifically refer to any particular kind of goods, but are general in their nature and are rendered specific only by their location opposite a given item. Each rubber stamp imprint, therefore, is suitable for use with various kinds of goods. The system is thus extremely flexible and simple, meeting practically all contingencies arising in the filling of orders, and reducing to a minimum the dictation and writing of letters of explanation.

When the combined bill and correspondence sheet is received by the customer, he has not only a bill for the goods sent, but a list of items omitted, if any, with an explanation of the reason for the omission, and any explanation that may be necessary regarding the items shipped.

I claim as my invention:

1. A combined bill and correspondence sheet provided with parallel horizontal lines to form spaces and means dividing said spaces into a plurality of vertical columns, said columns being provided with indicia defining the nature of the data to be entered therein respecting the items of the bill, said sheet being provided at one edge with a column of spaces of substantial size, there being a separate space for and coinciding with each item of the bill, said column having a heading indicating that said spaces are for general correspondence concerning the items alined with the respective spaces.

2. A combined bill and correspondence sheet divided into two general parts one of which is provided with parallel horizontal lines to form spaces and means dividing said spaces into a plurality of vertical columns, said columns being provided with indicia defining the nature of the data to be entered therein respecting the items of the bill, said part being provided at one edge with a column of spaces of substantial size, there being a separate space for and coinciding with each item of the bill, said column having a heading indicating that said spaces are for general correspondence concerning the items alined with the respective spaces, the other part of said sheet being separated from the first part by a division line and ruled to form spaces containing indicia directed generally to the whole order.

In testimony whereof, I hereunto set my hand in the presence of two witnesses.

ALONZO E. COLE.

In the presence of—
EDNA LEIGHTON,
C. M. GARMON.

Copies of this patent may be obtained for five cents each, by addressing the "Commissioner of Patents, Washington, D. C."

It is hereby certified that in Letters Patent No. 1,208,293, granted December 12, 1916, upon the application of Alonzo E. Cole, of Chicago, Illinois, for an improvement in "Bill and Correspondence Sheets," an error appears in the printed specification requiring correction as follows : Page 1, line 16, for the word "filed" read *filled;* and that the said Letters Patent should be read with this correction therein that the same may conform to the record of the case in the Patent Office.

Signed and sealed this 16th day of January A. D., 1917.

[SEAL.]                                                  F. W. H. CLAY,
*Acting Commissioner of Patents.*

Cl. 11—19.